United States Patent
Alexander et al.

(10) Patent No.: US 10,237,334 B2
(45) Date of Patent: Mar. 19, 2019

(54) CONNECTED-MEDIA END USER EXPERIENCE USING AN OVERLAY NETWORK

(71) Applicant: Akamai Technologies, Inc., Cambridge, MA (US)

(72) Inventors: Kristofer Alexander, North Reading, MA (US); Andrew F. Champagne, Ware, MA (US); F. Thomson Leighton, Newtonville, MA (US); Robert Neville, San Mateo, CA (US); William Law, Corte Madera, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 920 days.

(21) Appl. No.: 14/148,849

(22) Filed: Jan. 7, 2014

(65) Prior Publication Data

US 2014/0195653 A1    Jul. 10, 2014

Related U.S. Application Data

(60) Provisional application No. 61/749,630, filed on Jan. 7, 2013.

(51) Int. Cl.
*G06F 15/16* (2006.01)
*H04L 29/08* (2006.01)
(Continued)

(52) U.S. Cl.
CPC .......... *H04L 67/10* (2013.01); *H04L 65/4084* (2013.01); *H04N 21/2181* (2013.01);
(Continued)

(58) Field of Classification Search
CPC .......... H04N 21/4126; H04N 21/4122; H04N 21/8547
(Continued)

(56) References Cited

U.S. PATENT DOCUMENTS 7,610,332 B2    10/2009  Barbir et al.
8,495,675 B1 *   7/2013  Philpott .............. H04H 20/103
                                                    725/105
(Continued)

FOREIGN PATENT DOCUMENTS

JP        2012114649 A      6/2012
KR     1020100078256 A      7/2010
WO       2012/166739 A3    12/2012

OTHER PUBLICATIONS

EPO Application 14735318.9, European Search Report dated Jul. 11, 2016, 7 pages.
(Continued)

*Primary Examiner* — Quang N Nguyen
(74) *Attorney, Agent, or Firm* — David H. Judson

(57) ABSTRACT

An Internet infrastructure delivery platform (e.g., operated by a service provider) provides an overlay network (a server infrastructure) that is used to facilitate "second screen" end user media experiences. In this approach, first media content, which is typically either live on-demand, is being rendered on a first content device (e.g., a television, Blu-Ray disk or other source). That first media content may be delivered by servers in the overlay network. One or multiple end user second content devices are then adapted to be associated with the first content source, preferably, via the overlay network, to facilitate second screen end user experiences (on the second content devices).

19 Claims, 7 Drawing Sheets

(51) Int. Cl.
  *H04L 29/06* (2006.01)
  *H04N 21/218* (2011.01)
  *H04N 21/2225* (2011.01)
  *H04N 21/2365* (2011.01)
  *H04N 21/41* (2011.01)
  *H04N 21/434* (2011.01)
  *H04N 21/61* (2011.01)
(52) U.S. Cl.
  CPC ..... *H04N 21/2225* (2013.01); *H04N 21/2365* (2013.01); *H04N 21/4122* (2013.01); *H04N 21/4347* (2013.01); *H04N 21/6125* (2013.01)
(58) Field of Classification Search
  USPC ....... 709/203, 217, 219, 223, 224, 226, 228, 709/230, 232, 238
  See application file for complete search history.

(56) References Cited

U.S. PATENT DOCUMENTS

| | | | | |
|---|---|---|---|---|
| 9,332,051 | B2* | 5/2016 | Brueck | H04L 65/607 |
| 9,332,296 | B2* | 5/2016 | Ma | H04N 21/231 |
| 9,596,323 | B2* | 3/2017 | Luby | H04L 67/02 |
| 2010/0011135 | A1 | 1/2010 | Jawa et al. | |
| 2011/0055347 | A1 | 3/2011 | Hu et al. | |
| 2011/0185036 | A1 | 7/2011 | Lanier et al. | |
| 2011/0231490 | A1 | 9/2011 | Inoue et al. | |
| 2012/0210349 | A1* | 8/2012 | Campana | G06F 3/147 725/32 |
| 2012/0311074 | A1 | 12/2012 | Arini et al. | |
| 2013/0132515 | A1* | 5/2013 | Mostafa | H04L 67/32 709/217 |
| 2013/0183021 | A1* | 7/2013 | Osman | H04N 9/87 386/239 |
| 2013/0347018 | A1* | 12/2013 | Limp | H04N 21/4826 725/19 |
| 2014/0024341 | A1* | 1/2014 | Johan | H04L 63/0884 455/411 |
| 2014/0103104 | A1* | 4/2014 | Jover | H04N 21/4126 235/375 |
| 2014/0129570 | A1* | 5/2014 | Johnson | H04N 21/4126 707/748 |
| 2014/0143803 | A1* | 5/2014 | Narsimhan | H04N 5/44591 725/34 |
| 2014/0156801 | A1* | 6/2014 | Fernandes | H04L 67/26 709/219 |
| 2015/0134846 | A1* | 5/2015 | Bazar | H04L 65/608 709/231 |
| 2015/0271232 | A1* | 9/2015 | Luby | H04L 65/4084 709/231 |
| 2016/0006805 | A1* | 1/2016 | Ulupinar | H04L 67/02 709/217 |
| 2016/0323606 | A1* | 11/2016 | Mao | H04L 43/0876 |
| 2017/0171578 | A1* | 6/2017 | Joong | H04L 65/4084 |

OTHER PUBLICATIONS

Machine Translation for KR-10-2010-0078256, 13 pages.
PCT/US2014/010429, International Search Report and Written Opinion, dated Apr. 30, 2014, 9 pages.
Office action, China Patent Application No. 201480011670.1, dated Nov. 16, 2017.
Rule 71(3) Communication, European Patent Office, European Patent Application No. 14735318.9, dated Nov. 14, 2018.

* cited by examiner

CONNECTED-MEDIA END USER EXPERIENCE USING AN OVERLAY NETWORK

BACKGROUND

Technical Field

This application relates generally to a cloud-based solution that allows extension of an end user entertainment experience from a "primary" device, to a "secondary" device.

Brief Description of the Related Art

Distributed computer systems are well-known in the prior art. One such distributed computer system is a "content delivery network" or "CDN" that typically is operated and managed by a service provider. The service provider typically provides the content delivery service on behalf of third parties (customers) who use the service provider's network resources, which (as properly configured and managed) comprise a large, fault-tolerant content-delivery infrastructure. A distributed system of this type is sometimes referred to as an "overlay network" and typically refers to a collection of autonomous computers linked by a network or networks, together with the software, systems, protocols and techniques designed to facilitate various services, such as content delivery, application acceleration, or other support of outsourced origin site infrastructure. A CDN service provider typically provides service delivery through digital properties (such as a website), which are provisioned in a customer portal and then deployed to the network.

"Second screen" technologies provide a way for a content provider that is providing first content to a "first" device (e.g., a television) to make second content available on a "second" device (e.g., a computer). The second content may have some predetermined relationship with the first content. In one known technique, the content provider embeds information in an audio signal output (on a first device) from a movie player or television broadcast. The information typically is in the form of a fingerprint or watermark that identifies given ancillary content, and a current play location of the first content on the first device. A second screen application executing on the second device then "listens" to the audio signal from the first device continuously to perform an automatic content recognition function using the information embedded in the audio signal that is being monitored. When the second device application "hears" the program content, and assuming the second device has or can obtain the second content, the second content is then rendered in synchronization with activity occurring in the first content.

The above-described approach has certain drawbacks. In the first instance, the approach requires that the first content be modified to include the information. This modification may not be possible (for technical, legal or other business reasons). Moreover, the approach typically requires a dedicated second device application. Further, the approach is not scalable for multiple second source users, as typically the approach requires the second content and the first content to be co-located (e.g., on the same disk).

It would be desirable to enhance known second screen techniques to take advantage of overlay networking technologies.

BRIEF SUMMARY

An Internet infrastructure delivery platform (e.g., operated by a service provider) provides an overlay network (a server infrastructure) that is used to facilitate "second screen" end user media experiences. In this approach, first media content, which is typically either live or on-demand, is being rendered by a first content device (e.g., a television, Blu-Ray disk or other source). That first media content may be delivered by servers in the overlay network. One or multiple end user second content devices are then adapted to be associated with the first content source, preferably, via the overlay network, to facilitate second screen end user experiences (on the second content devices).

In one embodiment, synchronous or asynchronous updates are received at the overlay network infrastructure from a first content source, such as a media player. At least one update identifies first media content, and data identifying a temporal location within the first media content. One or more event requests are then received at the overlay network infrastructure from a second content device that is distinct from the first content source. At least one event request seeks an event identifier associated with second (or "companion") content capable of being rendered at the second content device in synchronization with the first media content being rendered on the first content source. In response to receipt of the at least event request, the overlay network infrastructure returns to the second content device the event identifier. The event identifier is an instruction to the second content device to render the second content. In response to the overlay network infrastructure receiving a content request that includes the event identifier, the overlay network serves the second content to the second content device for rendering at the second content device in synchronization with rendering of the first media content on the first content source.

In a variant embodiment, an individual associated with a second content device may have different roles, such as an unauthenticated guest, or an authenticated user. An unauthenticated user just receives the companion content. An authenticated user, in addition to receiving the companion content, can also use the second content device as a remote control to issue, via the overlay network, a content change request with respect to the first content source. The content change request typically is one of: an instruction to alter the temporal location within the first media content, an instruction to pause, resume, fast-forward, rewind or terminate rendering of the first media content, and an instruction to initiate rendering of new media content.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
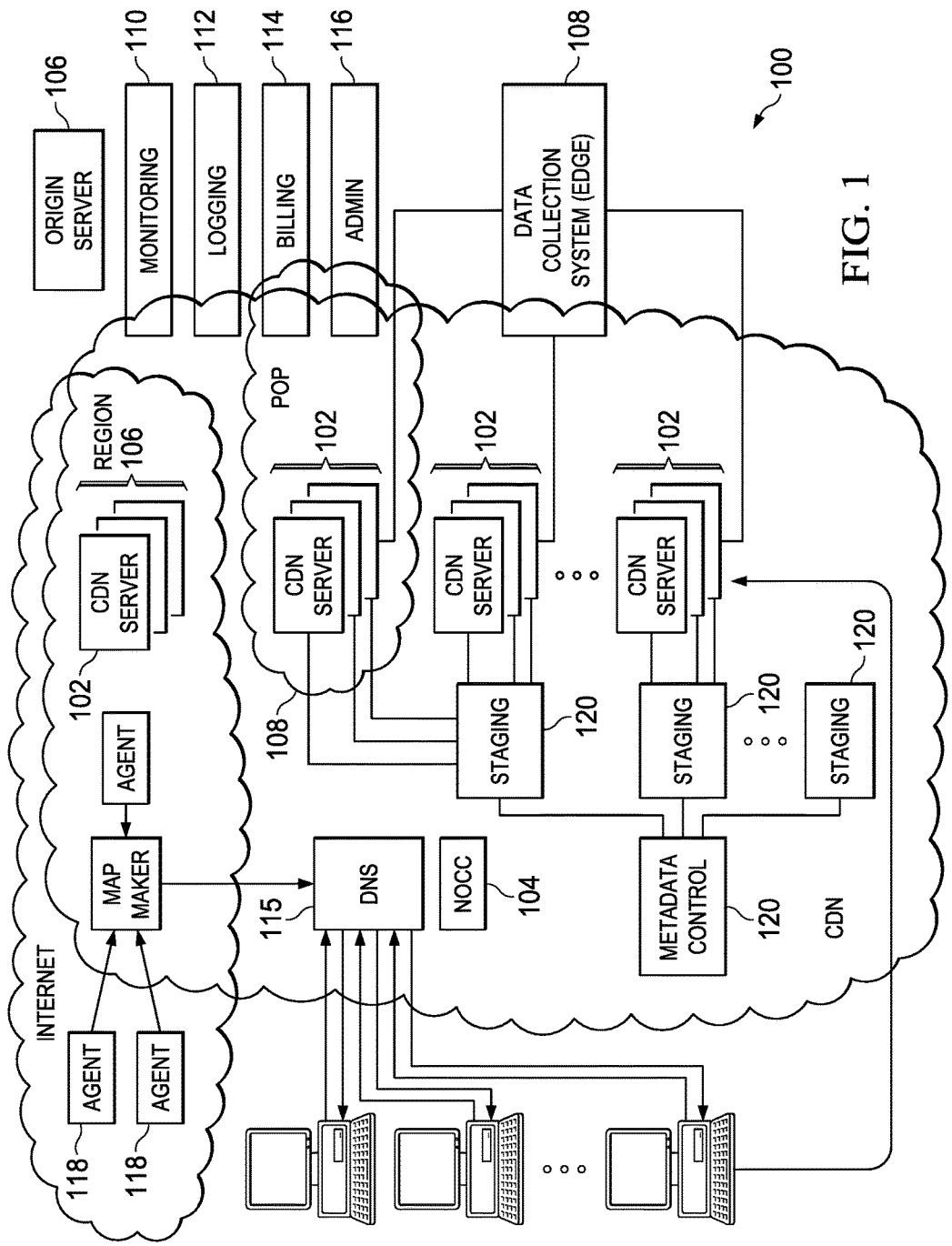
FIG. 1 is a block diagram illustrating a known distributed computer system configured as an overlay network.

FIG. 1 illustrates a known distributed computer system that provides an overlay network and that is used herein to facilitate connected-media end user experiences according to this disclosure. In particular, in a preferred embodiment, and with respect to content being rendered on a first device or "player," the overlay network provides "second screen" content to one or typically multiple second devices or "companions." Generalizing, as used herein a "player" or "media player" refers to any device, program or system (generically a "source") capable of displaying media content on a display screen (e.g., a television, a monitor, etc.). Representative first devices or sources include, without limitation, a television, a digital video recorder (DVR), a set-top box, Apple TV, an Internet-based delivery system (e.g., NetFlix®, Hulu®, etc.), content delivered from the overlay network or some third party network, or the like. Thus, in general, the media (first screen) content may exist locally (e.g. DVD, Blu-Ray disk, download, etc.) or may be delivered to the player from a remote source (e.g., the overlay network, TV/cable/satellite, etc.). To enable the second screen user experience, the player is able to uniquely identify an identifier (ID) of the media content, and to communicate, preferably via the Internet or a private network (in whole or in part), with remote server infrastructure of the overlay network. A "companion" refers to any device, program or system capable of displaying companion (second) content in synchronization with media content being rendered on a display screen of a player. A companion is sometimes referred to as a "second content source" to distinguish it from the "first content source" from which the first media content is being rendered. The companion acts as a "source" in providing content to the user of the device.

As will be described, by associating one or more companion device(s) with a specific player, the companion devices retrieve companion content from the overlay network cloud (typically, one or more Internet-accessible locations) and display that companion content in synchronization with live or on-demand media content currently being rendered by the player. The companion content is delivered in a format appropriate for a rendering engine (e.g. a web browser, a browser plug-in, an application such as a mobile app, or the like) on each companion device. In this manner, the end users associated with the companion devices received an enhanced connected-media end user experience.

FIG. 1 illustrates a representative overlay network in which the techniques of this disclosure may be practiced. The particular details of the overlay network are not intended to be limited. Indeed, one or more functions of a technology platform that may act as an intermediary (between a player and one or more companion devices) as described herein may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

Referring back to FIG. 1, in an overlay networking embodiment, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
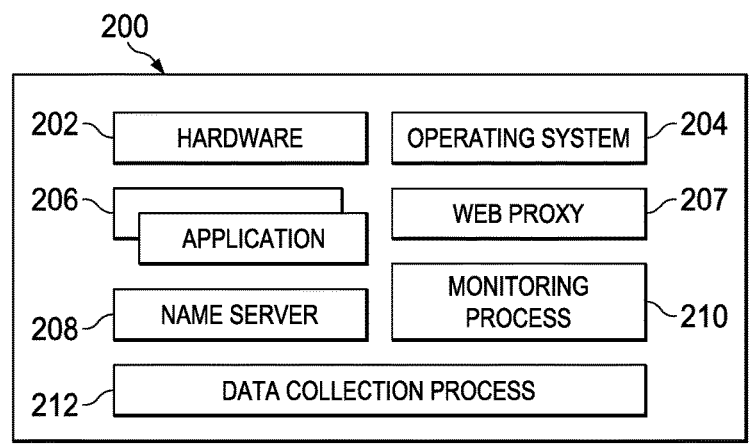
FIG. 2 is a representative overlay network edge machine configuration.

As illustrated in FIG. 2, a given overlay network server machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP (web) proxy 207, a name server 208, a local monitoring process 210, a distributed data collection process 212, and the like.

For streaming media, the CDN machine typically includes one or more media servers, such as Apple® QuickTime® server, Microsoft® Windows Media Server (WMS) or Adobe® Flash server, as required by the supported media formats. An alternative to using dedicated media servers uses HTTP as the transport protocol. Architectures for HTTP-based live stream and VOD-based delivery are described in U.S. Publication No. 20110173345. That approach is implemented within a CDN and includes the high level functions of recording the content stream to be delivered using a recording tier, and playing the stream using a player tier. The step of recording the stream includes a set of sub-steps that begins when the stream is received at a CDN entry point in a source format. The stream is then converted into an intermediate format (IF), which is an internal format for delivering the stream within the CDN and comprises a stream manifest, a set of one or more fragment indexes (FI), and a set of IF fragments. The player process begins when a requesting client is associated with a CDN HTTP proxy, such as the ghost-based proxy. In response to receipt at the HTTP proxy of a request for the stream or a portion thereof, the HTTP proxy retrieves (either from the archive or the data store) the stream manifest and at least one fragment index. Using the fragment index, the IF fragments are retrieved to the HTTP proxy, converted to a target format, and then served in response to the client request. The source format may be the same or different from the target format. Preferably, all fragments are accessed, cached and served by the HTTP proxy via HTTP. In another embodiment, a method of delivering a stream on-demand (VOD) uses a translation tier (in lieu of the recording tier) to manage the creation and/or handling of the IF components.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

An overlay network web proxy (such as proxy 207 in FIG. 2) that is metadata-configurable is sometimes referred to herein as a global host or GHost process.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

The technologies described above provide for a large, distributed, fault-tolerant content-delivery infrastructure that can be used to deliver any type of content, including location-aware companion content. Companion content, especially advertising, can be targeted, e.g., based on end user location, known properties of the user (e.g., preferences, or the like).

Typically, but without limitation, a companion device is a mobile device, such as a smartphone or tablet (e.g., an iPhone® or iPad®). Such a device comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Figure 3:
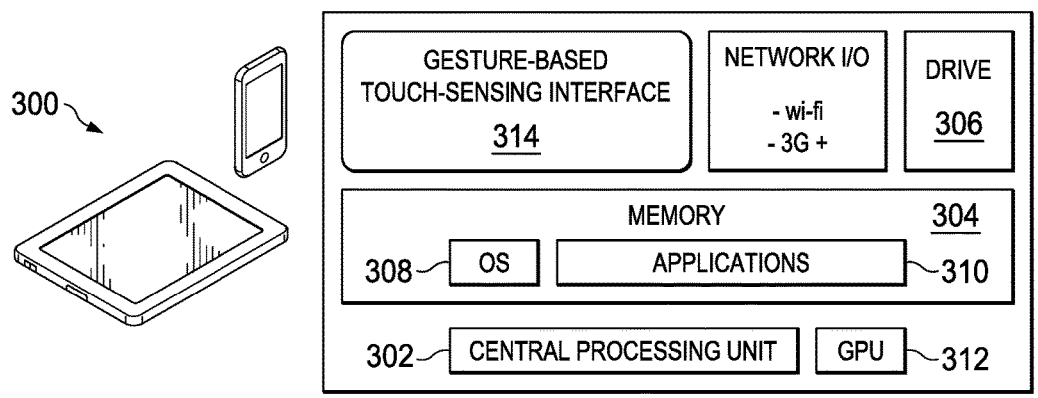
FIG. 3 is a representative companion device.

As seen in FIG. 3, a representative companion device 300 comprises a CPU (central processing unit) 302, such as any Intel- or AMD-based chip, computer memory 304, such as RAM, and a drive 306. The device software includes an operating system (e.g., Apple iOS, Google® Android™, or the like) 308, and generic support applications and utilities 310. The device may also include a graphics processing unit (GPU) 312. In particular, the mobile device also includes a touch-sensing device or interface 314 configured to receive input from a user's touch and to send this information to processor 312. The touch-sensing device typically is a touch screen. The touch-sensing device or interface 314 recognizes touches, as well as the position, motion and magnitude of touches on a touch sensitive surface (gestures). In operation, the touch-sensing device detects and reports the touches to the processor 312, which then interpret the touches in accordance with its programming. Typically, the touch screen is positioned over or in front of a display screen, integrated with a display device, or it can be a separate component, such as a touch pad. The touch-sensing device is based on sensing technologies including, without limitation, capacitive sensing, resistive sensing, surface acoustic wave sensing, pressure sensing, optical sensing, and/or the like.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

As noted above, the companion device is not limited to a mobile device, as it may be a conventional desktop, laptop or other Internet-accessible machine or device running a web browser, browser plug-in, or other application. It may also be a mobile computer with a smartphone client, any network-connected appliance or machine, any network-connectable device (e.g., a smart wrist device), or the like.

Connected-Media End User Experience Using an Overlay Network

Figure 4:
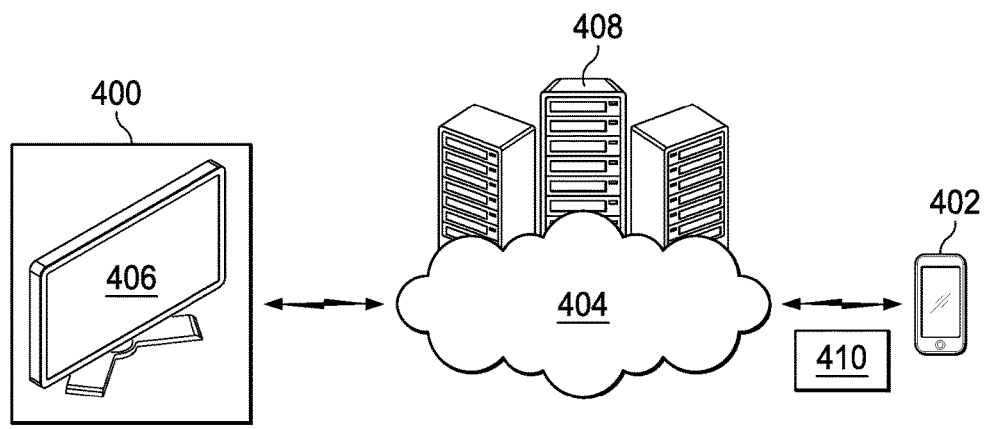
FIG. 4 illustrates the overlay network-based second screen approach of this disclosure.

With the above as background, FIG. 4 illustrates the basic operating principle of the overlay network-based second screen approach of this disclosure. In this approach, there is a first device 400 on which the primary content is rendered, a second or "companion" device 402 on which the companion content is rendered, and the overlay network infrastructure 404 operating as an intermediary between the first device and the companion device. Typically, there are multiple companion devices associated with the first device. Although not shown explicitly, the individual devices interact over one or more wireline and/or wireless networks. As will be described, generally the first device 400 includes a player 406 that sends program (or other) content metadata (e.g., content ID, track location (current play position and state), timestamp, etc.) to a server 408, such as an edge network server, in the overlay network 404. Likewise, the companion device 402 interacts with the overlay network by making requests to the overlay network and, in particular, requests that seek information about what second screen content the companion device should be rendering and when. In response, the overlay network provides the companion device with one or more content bundles 410, preferably in real-time or near real-time, such that the second content is then rendered on the second device in timed coordination with given events occurring in the first content. The overlay network infrastructure 404 manages the synchronization between the media player 406, on the one hand, and the one or more companion devices 402, on the other hand. The approach does not require any dedicated or purpose-built content-specific application to be executing on the companion device, as the content may be served directly, e.g., as HTML5-based content pages or objects.

In one preferred embodiment, the primary content may be delivered from the overlay network as well (e.g., as streaming media).

Thus, according to the approach, the first device includes a player device 406 that is overlay network-aware such that it delivers to the overlay program content metadata to the overlay network (cloud) infrastructure; the companion device(s) then receives synchronized event information from an overlay network (or other designated) server and uses that information to obtain (e.g., retrieve) the companion content. The event information itself may be the companion content. In this embodiment, there is no connection necessary between the player device and the companion device, although in certain circumstances (described in more detail below), it may be desired to have some connectivity between the devices. By utilizing this approach, all of the advantages (regarding scalability, reliability, etc.) afforded by an overlay network are leveraged in the second screen approach.

Figure 5:
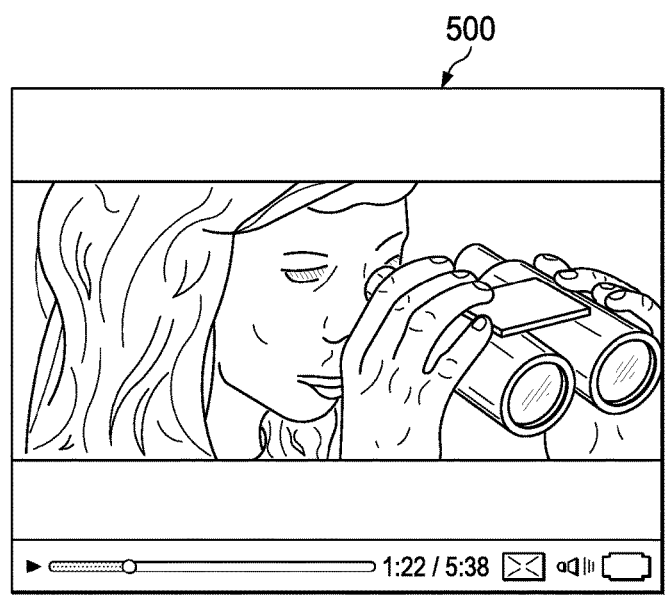
FIG. 5 illustrates a representative frame of first media content being rendered on a media player.
Figure 6:
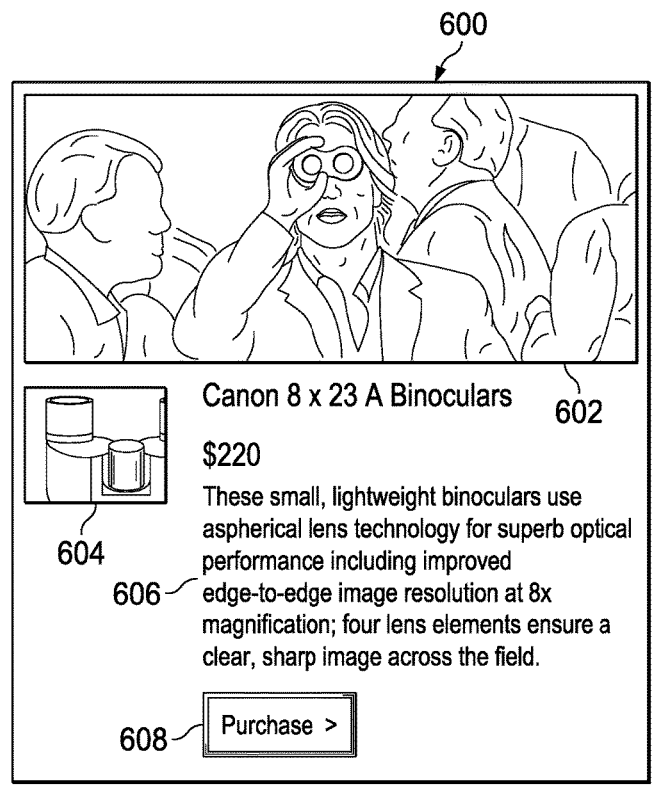
FIG. 6 illustrates representative companion content being rendered on a companion device screen when the second screen technique of this disclosure is implemented.

The basic second screen messaging model is as follows. Typically the first media content is a continuous media stream, such as a video, or other audiovisual content. The player 406 tells the overlay infrastructure 404 (more generally, the "cloud") that it is "playing the following media content" and is at a particular temporal location therein, typically measured from a start time, or from some other defined boundary in the content (typically a media stream). The companion devices ask the cloud infrastructure the basic question "what companion content should be displayed for the media content the player is playing"? The cloud infrastructure replies to this latter request with a response, such as "here is new companion content to display starting at a given time." FIG. 5 illustrates a movie clip portion 500 from the first media content; FIG. 6 illustrates representative companion content 600, which in this example is a description of the binoculars that the movie character is using in the current frame(s) of the first media content. In this example scenario, the first media content renders at a given time (e.g., timestamp 00:01:14), and when this time is reached (in the first media content) the player sends an update message to the cloud infrastructure. When the companion then makes its next companion event request to the cloud, the cloud delivers the binoculars companion content to the companion. This content is then rendered as shown in FIG. 6. In this example, the companion content is rendered as HTML5 content in a web browser, and it includes an image 602 from the movie, one or more graphics 604, text 606, and a link 608 (e.g., to a third party site) at which the product may be purchased. This is just one example of how the companion content may be formatted and is not intended to be limiting, as the companion content may include any type of markup, embedded objects, links, and the like. The companion content typically is delivered as a bundle (e.g., HTML, one or more embedded objects, etc.) in whole or in part from the overlay network.

In a preferred embodiment, the network server provides a response to the event request from the companion device, and that response includes an event identifier that is an instruction to the companion device to render the second content. Typically, the response is a URL to the companion bundle. A domain associated with the URL is then resolved back to identify an overlay network server from which the content bundle is retrieved. The providing of the response to the companion device and the obtaining/rendering of the companion content occurs seamlessly such that the second content is rendered in sync with the first media content frame. Thus, the end user sees both the first content media frame (FIG. 5) and the second content (FIG. 6), thereby receiving an enhanced "connected media" user experience as compared to just watching the first media content and/or watching the first media and browsing other, unrelated content on the second device.

Figure 7:
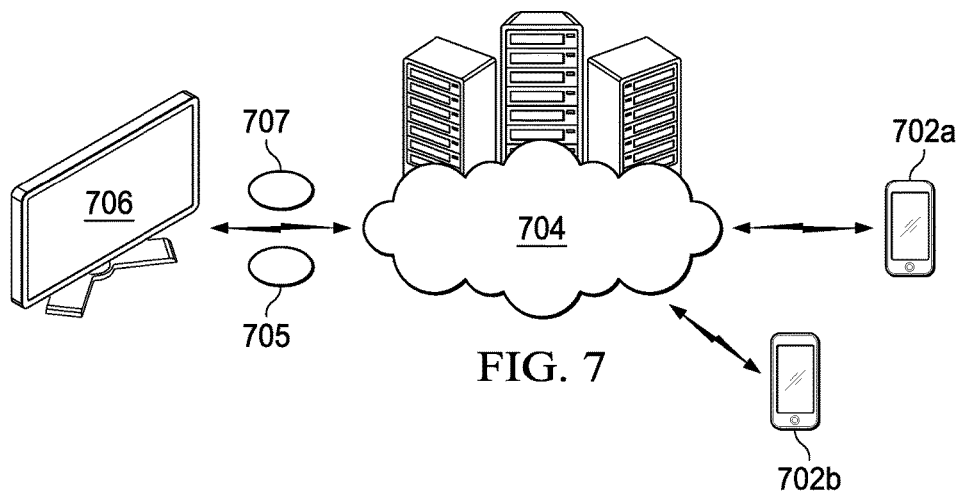
FIG. 7 illustrates an alternative embodiment wherein companion devices may be of different types to enable an authenticated end user to remotely control the content that is being rendered on the media player.

FIG. 7 illustrates a typical implementation scenario wherein there are multiple companion devices associated with a particular player. In this embodiment, the overlay network server infrastructure 704 manages the synchronization between the player 706 and the companion(s) 702*a* and 702*b*. Preferably, there are at least two possible "roles" for the companions, namely, a "user" role 702*a*, and a "guest" role 702*b*. A user typically is authenticated via an authentication mechanism (not shown). The authentication mechanism may be associated with the overlay network, or an overlay network customer site. As an authenticated user, and as an enhancement to the basic scheme described above, the companion device can act as a remote control with respect to the media player 706 and the first media content being rendered thereon. This is accomplished by the user companion device providing one or more content change requests to the media player, preferably via the overlay network. A guest companion 702*b*, in contrast, is non-authenticated and can only retrieve and display the second screen event content (the "guest capability"). Thus, the guest capability is as shown in FIG. 4 and described above. The user companion device 702*a* has both remote control and guest capability. As seen in this example, and as will be described in more detail below, the player 706 sends the content metadata (current content, track location, play state, etc.) 705 to the server infrastructure 704. The player also receives from the server infrastructure any content change requests 707 received from the user-enabled companion devices 702*a*. Thus, in this embodiment the messaging between the player and the overlay is potentially bidirectional.

Figure 8:
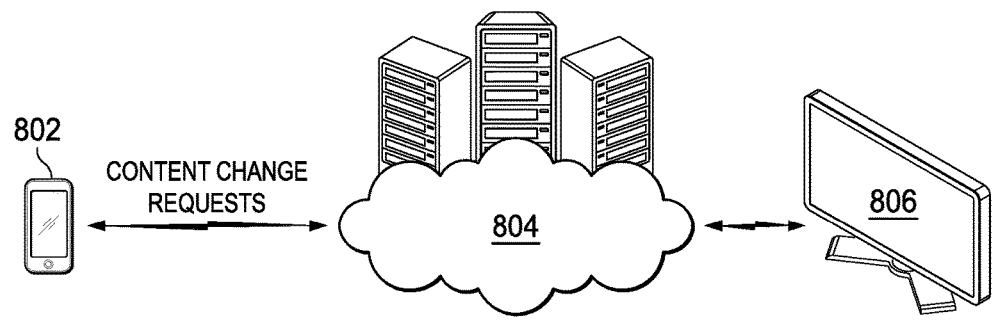
FIG. 8 illustrates how a companion device can remotely control the media player via the overlay network intermediary.

Thus, and as shown in FIG. 8, in addition to receiving companion content, an authenticated user 802 can remotely control a player (e.g., select new media content, pause/play/skip, etc.) 806. Here, and via the intermediary of the overlay network 804, an authenticated user companion device 802 requests the media content being rendered by the media player 806 be changed from the current program to a new program.

While the approach of using companion devices with multiple roles typically involves authentication, this is not a limitation. Generalizing, given companion devices may be associated with one or more roles, classes, profiles or the like (e.g., authenticated/unauthenticated, adult/child, male/female, etc.) to facilitate the implementation of coarse- or fine-level access controls. Thus, role-based access controls, policy-based access controls, or the like may be implemented or enforced by the overlay network.

Figure 9:
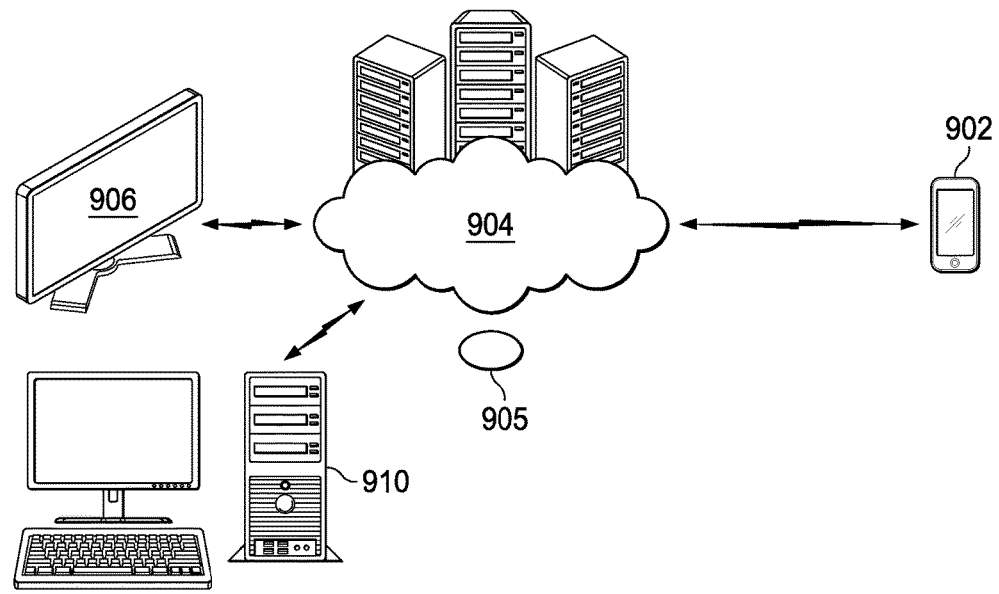
FIG. 9 illustrates how companion content changes may be propagated to the system, e.g., via a third party entity.

As illustrated in FIG. 9, companion content creation and update can occur at any time by having companion content and event timing triggers uploaded to the cloud server infrastructure. In this example, a third party (e.g., an overlay network customer) 910 uploads changes 905 in the companion content to the overlay network 904. These changes are then reflected on the companion devices 902. To this end, preferably each unique companion content event comprises a ContentID ("this event is associated with Media ContentID=xxx"), an EventTriggerTimeCode ("this event is to be displayed starting when the Media Content is at hh:mm:ss, and until a next EventTriggeTimeCode is reached"), and a companion content bundle (that includes one or more content objects). As described in the example above, the companion content bundle typically is a combination of static and/or dynamic text, images, video content, active controls, and any other content to be rendered on a companion device. Without limitation, the overlay network provider publishes one or more interfaces (e.g., a network-accessible extranet portal application, an application programming interface (API), or the like) through which the companion content event changes may be received.

Figure 10:
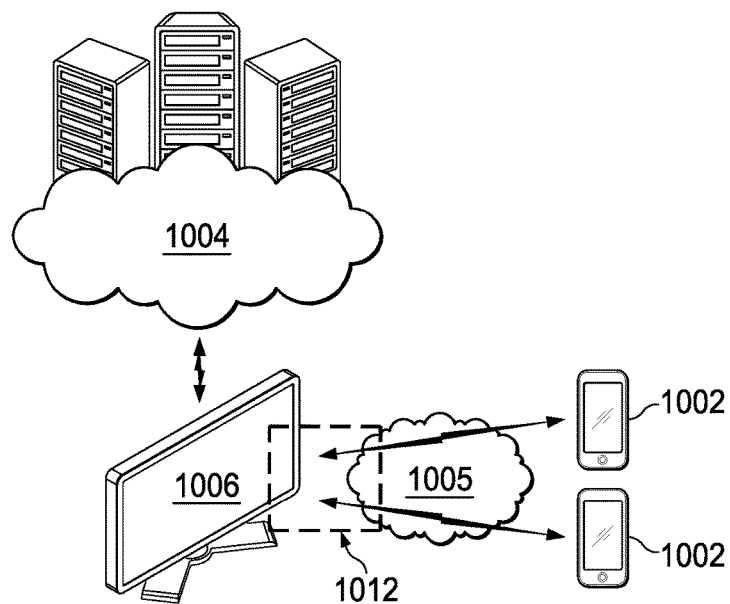
FIG. 10 illustrates a first variant of the companion content delivery model wherein the media player has a server associated therewith for serving the companion content in whole or part to the companion devices.

FIG. 10 illustrates a first alternative companion content delivery model. In this embodiment, companion content is retrieved by/delivered either to the player 1006 or another device available on a local network 1005 to which both the player and companion(s) 1002 are connected. Here, the player or local device takes the place (from the companion's point of view) of the cloud infrastructure, responding to messages from companion(s) just as the cloud infrastructure would do. Preferably, at initial synchronization, the cloud infrastructure 1004 is used to "broker" a connection between a player and companion(s). If it is not possible to create a connection (e.g., HTTP, web socket, etc.) between the player and companions, e.g., due to firewall restrictions, companions being located on carrier networks rather than local WiFi, etc., the cloud infrastructure (the basic cloud delivery approach described above) is used for managing the second screen events. Of course, the cloud-based and this alternative approach may be used simultaneously, as some companions may be able to connect locally while others may not.

Thus, in this first alternative approach (the "player-as-local server"), the player acts as a local server for companion devices. Thus, typically the player includes or has associated therewith a web server 1112. In this case, the player device retrieves second screen content from the overlay network server infrastructure and the companion devices communicate directly with the web server 1112 embedded in or associated with the player rather than with the server infrastructure.

Figure 11:
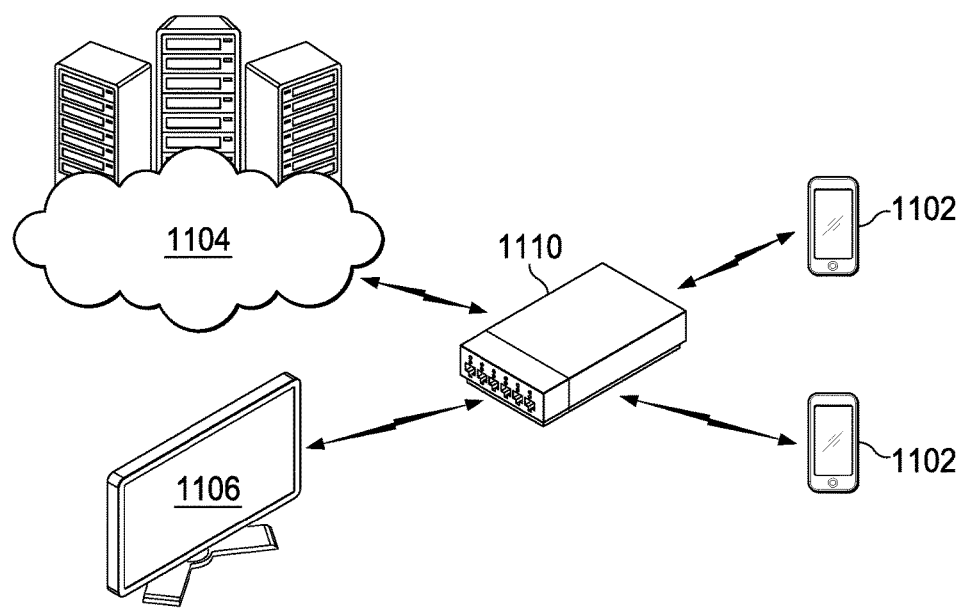
FIG. 11 illustrates a second variant of the companion content delivery model wherein a network device associated with the media player is used to deliver the companion content.

A second alternative (the "local device-as-local server") companion content delivery model is shown in FIG. 11. This embodiment involves having a local device (e.g., gateway, home internet router, etc.) 1110 act as a local server for the companion devices 1102. In this case, the local device retrieves second screen content from the overlay network (the Internet) 1104 and the companion devices communicate directly with the local device rather than with the infrastructure or the media player 1106.

The following provides additional details regarding various embodiments.

Figure 12:
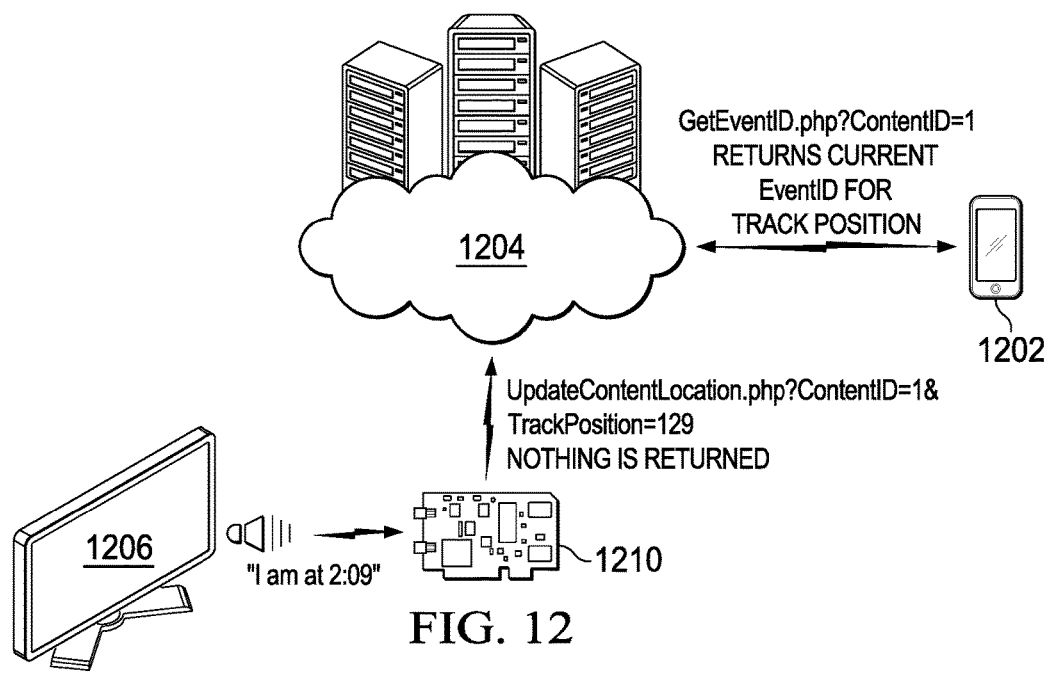
FIG. 12 illustrates another embodiment of the second screen technique.

FIG. 12 illustrates another embodiment of the second screen approach of this disclosure wherein the event information is programmed into the first content executing on the first device 1206. In this example, the first content is rendered on a first device, such as an optical rendering device (e.g., a Blu-Ray player). The rendering device includes a microcontroller (e.g., an Arduino card) 1210 that decodes timing signals from a timing beacon embedded in an audio track (being rendered on the first device). The microcontroller is programmed to decode the timing signal and send HTTP GET requests to an edge server in the overlay 1204 with a current play position. A representative GET may have the following syntax:

UpdateContentLocation.php?ContentID=1&TrackPosition=129.

This statement informs the server in the overlay that "the position on track 1 is currently 2:09." In this approach, there is no content response (provided to the player device that makes this GET request). The companion device 1202 preferably includes an HTML5-aware browser or mobile app executing on a smartphone or tablet. A user may navigate to the companion page in any convenient manner, e.g., entering a URL, selecting a URL, scanning a bar or QR code, or the like. In operation, the companion device receives event IDs in sync with the program content (rendering in the first device) by itself making synchronous HTTP GET requests to the overlay network infrastructure. In this manner, the companion content is obtained and rendered on the companion device. In one approach, the user of the device navigates to a companion page in which the second screen content is embedded directly. In an alternative, more preferred approach, the companion device pulls the event content from the edge server in the overlay network. A representative HTTP GET request might then be:

GetEventID.php?ContentID=1.

In response, the server returns the current EventID for the track position.

Different edge servers in the overlay network may process the HTTP GET requests issued by the first (player) and second (companion) devices.

As described above, in an alternative embodiment the companion device(s) may have different characteristics, one of which is that a companion device may control a media player. To enable authenticated companion "users" to control video content playback on the primary device, in this embodiment the media player is modified (or includes appropriate control routines) to "listen" for content change requests being issued by the companion device. As has been described, the companion page also is modified to support the two defined roles (user, guest) and to enable an authenticated "user" to pause, skip or select new content. In this alternative embodiment, the following messaging model may be used. After initial player setup (e.g., authentication, authorization, etc.) the player makes an application programming interface (API) call (preferably as an HTTP GET request) to the server. This call passes player metadata to the server as parameters of the GET request; in response, the return payload may include any pending content change request. If there is no pending content change request, no response it returned (as in the prior embodiment). After the initial companion setup, the companion typically makes only two API calls (preferably as HTTP GET requests), a first API call to Retrieve EventID for the current program content, and a second API call to submit a content change request. When the player makes a synchronous HTTP GET request, it now receives in its return payload any requested change (e.g., new content, pause/play, skip forward to next event, etc.).

As an example, assuming the play is currently playing ContentID=30 at 0:00:37.24 for user "Tom," the following HTTP GET request is sent:

ContentUpdate.php?UserID=Tom&ContentID=30&ContentTC=9724&PlayState=PLAY

If no content change has been made since the last player update, the server returns a string, such as "-|-|-|-" indicating that no change request is pending. The player then continues playing its current content. To determine the correct event to be displayed, the companion device makes a synchronous call to the server asking, in effect, "what EventID is valid for this particular user?" As an example:

HMEGetEvent.php?UserID=Tom

Preferably, a unique EventID (an integer) is returned, and the value instructs the companion to display the companion content associated with the current player content. If an authenticated "user" requests (from the companion page) a content change, that requested is submitted to the server, preferably as follows:

ContentChangeRequest.php?UserID=Tom&ContentID=13 and receives in response the return payload.

The above-described messaging syntax is not intended to be limited.

The use cases for the second screen experience are quite varied. The following provides several representative but non-limiting scenarios.

Imagine you're sitting in your living room, and that new-release thriller you've been waiting for is just starting on your big-screen television. The camera pans down from blue sky and clouds, and begins to zoom in . . . a gorgeous sports car speeding down a winding road. You ask yourself, "What is that car?" You glance down at your tablet computer just as its screen updates with several photos of the car and an invitation from a local dealer to "click here to reserve a test drive."

You click. Reservation complete, your eyes move back to the big screen and you imagine yourself behind the wheel of that gorgeous car—next Saturday at 2:30 pm.

A family sits down to enjoy a movie on the large-screen television (the "primary device") in their living room. While the movie is playing, each member of the family has a companion device (a smartphone, tablet, laptop, desktop, etc.) nearby. As the movie begins with a view of a beautiful beach, the companion device(s) update to provide information about the beach, behind-the-scenes information on how and why this location was chosen for the movie, etc.

Several minutes into the scene, one character offers another a name-brand cola. The companion device(s) display a promotional discount offer for purchase of this brand of cola at a nearby retailer. Later, during a scene at a sports stadium, the companion device(s) display information about the filming of the scene and offer an alternate "take" of this scene to be viewed on the companion device(s). It's your hometown stadium, and the companion content includes a link to see the schedule of events at the stadium.

Each member of the family can choose to view or not to view the companion content, and each member of the family can choose to interact or to not interact with the companion content.

A media experience such as described above is a hyper-connected (HME™), as it is an experience that "extends" (or augments or supplements) the end user entertainment from his or her "primary screen"—the one in the end user's living room (in this example)—to the end user's "secondary screen(s)"—such as, without limitation, tablets, smartphones, laptops. HME brings a wealth of dynamic, interactive content, referred to herein as "companion content," in sync with the movies, television shows, sporting events, concerts and anything else that are being watched, e.g., on a primary device. Preferably, the companion content is synchronized to the program being viewed via a "cloud" connection—i.e., both the primary device and the companion device(s) are connected to the Internet, and the primary device and the companion device(s) preferably talk to one another over the Internet; in a preferred embodiment, these communications occur using an overlay network (e.g., a CDN) service provider's server infrastructure.

The techniques described herein provide significant advantages beyond providing static "extras" (e.g., that are mastered into media content at production and never changing), because the techniques herein provide the capability to deliver up-to-the-minute dynamic, interactive, relevant and focused content tailored to an end user, as well as what is being shown on the user's Primary device at a particular time. The Companion Content can be tailored and targeted to specific geographic locations, users, and the like, e.g., using CDN content targeting functionality. Indeed, with awareness of who is viewing the content, where the viewer is location (and their preferences and interests), the techniques herein can deliver a unique, personal, highly-customized and customizable viewing experience. Thus, for example, during live broadcasts (e.g., sporting events, first-run television series episodes, etc.), the techniques described herein may augment the primary display content in one of many different ways, including displaying a running log of commentary by others watching the same event live.

As will be described, preferably the service provider's infrastructure keeps the end user program and Companion Content in synchronization, automatically and at all times.

The techniques herein facilitate "second screen" viewing and end user interactivity, as many tablet and mobile device users use their device while watching other (primary) sources (e.g., a big-screen television).

The following section provides additional details regarding components of the system in various embodiments.

HME Media Player

The HME Media Player is responsible for rendering the media program content to the Primary display device. The HME Media Player may be a dedicated physical device with HME capabilities (DVD/Blu-ray Player, Set-Top Streaming Device, external HME decoding device, etc.), or a software-defined Media Player with HME capabilities (application or service running on a video game console, laptop or desktop computer, etc.) As the HME Media Player renders media program content (e.g., play/pause/stop/ff/rw movie, for example), the HME Media Player is responsible for updating the HME Server Infrastructure (as defined below) with information necessary to keep the Companion content in sync with current program content.

HME Server Infrastructure

The HME Server Infrastructure is one (Single-Server Model) or more (Multiple, Distributed Servers Model) servers "in the cloud" to which both the HME Media Player and the HME Companion(s) are able to connect, and through which the HME Media Player and the HME Companion(s) pass information necessary to provide HME-synchronized content on the Companion Device(s).

HME Companion

An HME Companion is a device capable of displaying HME Companion Content in a browser or a Companion App. Examples of HME Companions include, with limitation, a smartphone, tablet or laptop/desktop browser connected to a Companion website, a smartphone, tablet or laptop/desktop running an Application ("app") communicating with the HME Server Infrastructure.

Association of HME Player to HME Companion(s)

For the HME Companion(s) to display content in sync with the media program content being displayed by the HME Player, the HME Player and HME Companion(s) need to be associated with one another.

HME Association: Anonymous/Non-Authenticated Model

In a simple association model, the association between the HME Player and the HME Companion(s) persists only until the HME Player is closed. Upon startup, the HME Player generates a unique SessionID that the Companion(s) uses to display content in sync with the HME Player. The HME Player provides the SessionID, along with a unique ContentID and the player's current location (FrameTime) to the HME Server Infrastructure, which will be translated into synchronized content information to be consumed by the HME Companion(s). The SessionID is displayed by the HME Player, e.g., as a QR Code and/or an alpha/numeric serial number.

As an example, if the unique SessionID generated by the HME Player is "12345678" and the URL for the Companion site is www.hostname.com/hyperconnected with the SessionID passed as a parameter within the URL, the full URL to associate the Companion device(s) with the HME Player would be as follows: www.hostname.com/hyperconnected-?SessionID=12345678. The Companion Device(s) could enter the SessionID '12345678' when prompted, or the user could scan the QR Code generated by the HME Player. Note that while the user needs only the SessionID to associate an HME Player with HME Companion(s), the HME Player must pass SessionID, ContentID and FrameTime to the HME Server for the HME Companion(s) to display the proper associated content.

HME Association: User Authentication Model

Whereas the Anonymous association described above is transactional in nature and does not persist, a more practical model is to associate an HME Player with specific users. Once a user registers with a given HME Player, the user's credentials can be used on the HME Player and on HME Companion(s) in place of the SessionID. This persistent association frees users from having to re-associate HME Players and HME Companions with a unique SessionID at the beginning of each new session. Depending upon the implementation model, a user's login credentials could be stored or could be required at the beginning of each HME Player session.

Companion Content Model

For the Companion website/app to display synchronized content, the Companion needs the following: (1) SessionID or UserID (and user authentication), (2) access to HME Content, and (3) awareness of when to display content. Item (1) has been described previously in this document. Item (2) requires that either (a) the HME Content is available/cached at the Companion Client (embedded in the Companion's local copy of the Companion site page(s) or Companion App data) or (b) the HME Content is available "in the cloud" for the HME Companion to access. To implement Item (3), preferably there is a time-bound association of specific media content time-ranges to specific Companion content to be displayed. This time-bound association is referred to as the "Companion Content Event Manifest," as described below.

Companion Access to Content

For the Companion to display Companion Content for a given event, the Companion needs that content to be available locally (that is, resident on the Companion device) or available "in the cloud" on demand when needed by the Companion. Each time a new ContentID is invoked by the HME Player, the Companion can be triggered to pre-fetch and cache the event content for that ContentID. From a user's perspective, this may provide better performance as the transactional overhead between the Companion and the Server is very low after the initial pre-fetch of Companion Content.

Companion Content Event Manifest

Preferably, each unique piece of Companion Content to be displayed is an event. Each unique piece of media content has a unique ContentID, and each ContentID has associated with it one or more EventIDs. Each EventID has an associated start time, and is considered to be active until the start of the next EventID. The association of specific events for specific content at specific times is defined by the Companion Content Event Manifest. Thus, e.g., a Companion Content Event Manifest for ContentID=12345678 with a new event every 7 minutes and a content running time of 30 minutes might look like the following:

| 12345678 | | |
|---|---|---|
| 00:00:00 | 0 | // Event ID 0 at the beginning of this 30-minute clip |
| 00:07:00 | 1 | // At 7 minutes, event 1 should be active |
| 00:14:00 | 2 | // At 14 minutes, event 2 should be active |
| 00:21:00 | 1 | // At 21 minutes, repeat event 1 |
| 00:28:00 | 3 | // At 28 minutes, event 3 should be active |
| 00:29:59 | 0 | // At conclusion of content, revert to event 0 |

The HME Server maintains the Companion Content Event Manifests, and under certain circumstances delivers the manifests to the HME Player and/or the HME Companion(s).

HME Player Timing Beacon

As media content is rendered by the HME Player, the player needs to communicate session, content and timing information to the HME Server. Preferably, this information is provided to the HME Server as the payload (parameters) of an HTTP GET request known as the HME Player Timing Beacon. Preferably, there are two modes of communication for delivering the HME Player Timing Beacon: Event Unaware, and Event Aware.

HME Player Timing Beacon: Event Unaware

The HME Player operates in Event Unaware Timing Beacon mode when the HME Player has no awareness of the Companion Content Event Manifest—that is, the player "knows" its current location within the content being played but does not "know" which when an its location crosses an event threshold. In this mode, the HME Player typically must update the server synchronously and frequently with its timing information to ensure that the Companion content will remain in sync with the media content. With frequent/synchronous updates (e.g., an interval of a few seconds or less), a high percentage of data sent from the HME Player to the HME Server is not useful—in the 30-minute example above, if the clip is played straight through and the player is updating the HME Server every 3 seconds, the HME Player will communicate with the server 20 times per minute for 30 minutes-600 updates sent to the server, only 6 of which will trigger a change of event displayed on the Companion(s). Because the user has control of the content playback and can pause, skip forward or back, etc. and because the HME Player has no awareness of the time ↔ event relationship, the HME Player has no "choice" but to update the HME Server on a near-constant basis.

HME Player Timing Beacon: Event Aware

To eliminate the inefficiency imposed by the Event Unaware timing beacon mode (as described above), the HME Player needs to have access to the Companion Content Event Manifest's time ⇆ event-change information. In one embodiment, an HME Player can be made event-change aware by requesting the Companion Content Event Manifest for a given ContentID each time the player begins playing that ConentID. Once the HME Player has received the Companion Content Event Manifest, the player only needs to send an update to the HME Server when an "event boundary" is crossed. Thus, e.g., in the 30-minute clip previously described, this means the HME Player would send updates at 00:00:00, 00:07:00, 00:14:00, 00:21:00, 00:28:00 and 00:29:59. In this example, which is merely representative, the communication overhead for the 30-minute clip played straight through is reduced by 99% over the Event Unaware mode. Note that if the user, for example, skips forward from 00:04:27 to 00:17:51 and plays from that point forward, the HME Player will send updates at 00:00:00, 00:17:51, 00:21:00, 00:28:00 and 00:29:59.

HME Player Timing Beacon: Source

The HME Player Timing Beacon can be timing information embedded in physical or virtual media (a sub-audible encoded signal reporting ContentID and FrameTime information), or it can be generated by the player directly based on ContentID and current player position within the content. Any media player with Internet connection capability can become an HME Media Player via a software update that enables the HME Player Timing Beacon protocol and functionality as described above. Using a player-generated Timing Beacon mechanism with retail DVD and Blu-ray media makes it possible to have a dynamic, connected media experience (as described herein) even for legacy media.

Thus, in one example scenario, a movie clip with embedded synchronous Timing Beacon signals (3-second interval) was recorded to a Blu-ray disc. As is well-known, Blu-ray Disc (BD) is an optical disc storage medium designed to supersede the DVD format. In this example, the Timing Beacon signals were extracted from the Blu-ray audio through external hardware, and the Timing Beacon data was sent to the HME server via HTTP GET requests (beacon data passed as parameters in URL). In an alternative embodiment, the timing information is provided from an overlay network edge server delivering a stream to a client, but this requires some assurance that the client player is rendering the stream to the screen exactly as and when delivered to the client. Typically, an edge server will opportunistically transmit a stream faster than the client player can render it (forward frames buffer client-side), and the edge server may not have visibility into how the stream is actually being consumed client-side.

HME Media Player

The terms "HME Media Player", "HME Player" and "the player" have been used interchangeably to refer to a hardware or software device used to render media content to a single display device (most commonly a television display). "HME Media Player" may refer to any of the following: any device incorporating HME functionality and used to render physical media (DVD, Blu-ray, any digital multimedia content stored in its entirety locally on internal or external storage), or any device incorporating HME functionality and used to render virtual/streaming media (live and/or on-demand digital multimedia content delivered progressively over a wired or wireless connection).

HME Functionality (Media Player)

To function as an HME Media Player, a device must be able to: communicate via networking protocols (including but not necessarily limited to HTTP), and tetermine the current content being rendered (ContentID) and current player location (hh:mm:ss) of that content.

In one example (but non-limiting) embodiment, a Player makes HTTP GET requests to HME Server with timing, content and channel (limited form of session) parameters. The HME Server uses the "content," "channel" and "track-time" parameters to resolve an event code, which is provided to the Companion HTML5 via an AJAX call from the Companion to the server.

HME Server Infrastructure

The terms "HME Server Infrastructure," "HME server" and "the server" have been used interchangeably to refer to one or more servers working to associate media content on a viewer's primary screen (most commonly a television screen) with synchronized content on one or more secondary screens (Companion Device(s)). Typically, the HME Media Player and HME Companion(s) do not communicate directly with one another; rather, both communicate separately with the HME Server Infrastructure preferably via standard Internet protocols, with the HME Server Infrastructure translating the player's {SessionID|UserID, ContentID, FrameTime} information into the appropriate {ContentID, EventID} information needed by the Companion to display content synchronized with the player's current media content. Although the association between an HME Media Player and HME Companion(s) appears stateful to a user (it "feels" to the user as if the two are persistently-connected), the connections from the player and companion(s) to the server between them need not be stateful. Thus, e.g., if the server generates its event information in a way that it is available to any HME Server, the server responding to a request from the Companion need not be the server to which the HME Media Player communicated its media content details. In practice, both the HME Media Player and HME Companion(s) for a given user experience are in the same place; thus, mapping a given HME Media Player and its associated HME Companion(s) to the same HME Server seems reasonable in the general/typical case. Further, it is not necessary that the player have any knowledge of the event timing triggers (the manifest), but the player can request this information from the server and greatly improve overall efficiency by sending only relevant updates to the server.

HME Companion

In a sample (non-limiting) embodiment, the HME Companion site is implemented in HTML5 and Companion content is embedded in the Companion site content. In an alternative approach, the HME Companion preferably receives content incrementally from HME Server Infrastructure, render contents from overlay network edge servers (or from customer origins), and can pre-fetch Companion content when a new piece of content is selected (ContentID changes on player).

HME Workflow—Use Scenarios

Case 1: Blue-ray

Registration between HME Player & HME Companion: Fixed/hard-coded

HME Media Player: Sony Playstation 3

HME Media: Blu-ray disc, film clip with HME Timing Beacon signals encoded in audio track (external hardware device intercepted audio stream and sent beacon signal to HME Server via HTTP GET requests)

HME Server: Single PHP primary server instance; single PHP secondary server instance for manual failover.

HME Companion: HTML5 site with event-specific content incorporated into site footprint.

Workflow:
1. HME Media Player infrastructure initialized (Sony Playstation 3 with HME demo Blu-ray placed on standby)
2. User launches Companion site on his or her devices via QR code.
3. Content on HME Media Player changed, e.g., using PS3 Blu-ray remote. Companion site updates in response to event triggers (manifest embedded in HME Server PHP code)

Case 2: Streaming Workflow

The film clip source is the primary content, this time delivered via the CDN streaming service. The Timing Beacon pulses are not present in the audio track of the Streaming clip, as the timing is generated by Javascript code on the Streaming player page. The source video clip is encoded for multiple bitrate adaptive streaming to ensure the best fidelity over a wide range of network conditions.

Registration between HME Player & HME Companion: Channel from 1-10 is selected HME Media Player: Adobe Strobe player, HTML player page w/Javascript for Timing Beacon generation; Channel selected via dropdown HME Media: Adaptive bitrate media streamed CDN edge servers HME Server: Single PHP primary server instance HME Companion: HTML5 site with event-specific content incorporated into site footprint; channel selected via dropdown Workflow:
1. HME Companion site is launched; channel (1-10) is selected via dropdown menu
2. HME Media Player page is launched; channel (1-10) is selected via dropdown menu
3. HME Companion content updates in sync with HME Media Player Case 3: Streaming Workflow—Non-Authenticated In this case, no user identity is used (the sessionID is used to associate player & Companion)

Registration between HME Player & HME Companion: No registration (anonymous/non-authenticated)

HME Media Player: Embedded stream player, HTML player page w/Javascript for Timing Beacon generation HME Media: Adaptive bitrate media streamed from CDN edge service HME Server: Distributed, load-balanced servers on CDN HME Companion: HTML5 site, no embedded event-specific content (event content is pulled from CDN edge)

Workflow:
1. HME Media Player page is launched. HME Media Player generates and displays SessionID & QR code (QR code is link to Companion site with SessionID parameter in URL)
2. HME Companion is launched via QR code scan or by entering SessionID as displayed by HME Media Player
3. Media Content to be viewed is selected on HME Media Player content browser page
   a. If configured to do so for the content and HME Media Player client, the server can instruct the player to receive the Companion Content Event Manifest and to send updates to the server asynchronously on eventChange triggers (crossing event-time thresholds)
4. HME Media Player begins media playback when user clicks "play"; HME Companion displays event content in sync with media content
   a. If configured to do so for the given content and Companion client, the server can instruct the Companion to pre-fetch the Companion event content to be displayed for this content Case 4: Streaming Workflow—Authenticated In this case, user identity is used (user is authenticated on player & companion) Registration between HME Player & HME Companion: User begins registration process on player. Upon successful registration, unique user account is activated in HME Server Infrastructure HME Media Player: Embedded stream player, HTML player page w/Javascript for Timing Beacon generation HME Media: Adaptive bitrate media streamed from CDN edge server HME Server: Distributed, load-balanced servers on CDN HME Companion: HTML5 site, no embedded event-specific content (event content is pulled from CDN edge)

Workflow:
1. HME Media Player page is launched. User logs in with credentials, or is authenticated via cached credentials.
2. HME Companion is launched, user logs in with credentials or is authenticated via cached credentials.
3. Media Content to be viewed is selected on HME Media Player content browser page
   a. If configured to do so for the content and HME Media Player client, the server can instruct the player to receive the Companion Content Event Manifest and to send updates to the server asynchronously on eventChange triggers (crossing event-time thresholds)
4. HME Media Player begins media playback when user clicks "play"; HME Companion displays event content in sync with media content
   a. If configured to do so for the given content and Companion client, the server can instruct the Companion to pre-fetch the Companion event content to be displayed for this content Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTP, such as HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques described herein may be used for many types of use cases including, without limitation, voting/surveying, live blogging scroll for viewers who are not live, sub-title displays (displayed for multiple users in different languages simultaneously on companion devices), and others.

What is claimed is as follows:

1. Apparatus associated with an overlay network, comprising:
   one or more hardware processors;
   computer memory associated with the one or more hardware processors and in which are stored computer program instructions executed by the one or more hardware processors, the computer program instructions comprising:
   first program code to receive updates from a first content source, at least one update identifying first media content, and data identifying a temporal location within the first media content, wherein an update is generated at the first content source based on an entry in a second content source event manifest previously delivered to the first content source via the overlay network, the second content source event manifest comprising a set of event boundaries that are equally spaced based on a play length of the first media content, the update indicating that the temporal location within the first media content has been reached and an event boundary in the set of event boundaries is crossed; and second program code (i) to receive one or more event requests from a second content source distinct from the first content source, at least one event request seeking an event identifier associated with second content capable of being rendered at the second content source in synchronization with the first media content being rendered on the first content source, and (ii) in response, to return to the second content source the event identifier, the event identifier being an instruction to the second content source to obtain and render the second content on the second content source at a given time that corresponds to the event boundary in the first media content set of event boundaries being crossed;

wherein the first program code and the second program code operate autonomously from one another such that the updates are uncorrelated with the event requests;

wherein the first content source is a media player, and the second content source is one of: an Internet browser, a browser plug-in, and a mobile application.

2. The apparatus as described in claim 1, wherein the computer program instructions further include:

third program code to receive from the second content source a content request that includes the event identifier and, in response, to serve the second content to the second content source for rendering at the second content source in synchronization with rendering of the first media content on the first content source.

3. The apparatus as described in claim 1, wherein the computer program instructions further include:

fourth program code to serve the first media content to the first content source.

4. The apparatus as described in claim 1, wherein the media player is a software-based media player that includes program code to generate updates that are synchronous.

5. The apparatus as described in claim 1, wherein the first program code and the second program code are co-located in an edge server of the overlay network.

6. The apparatus as described in claim 1, wherein the first program code and the second program code are executed in first and second distinct edge servers of the overlay network.

7. The apparatus as described in claim 1, wherein the at least one update is passed as a set of parameters in a request.

8. The apparatus as described in claim 1, wherein the at least one event request is passed as a set of parameters in a request.

9. The apparatus as described in claim 1, wherein the at least one event request also includes data associated with a role.

10. The apparatus as described in claim 9, wherein the role is one of: an authenticated user, and an unauthenticated guest.

11. The apparatus as described in claim 10, wherein the at least one event request that includes data associated with an authenticated user role includes a content change request with respect to the first content source.

12. The apparatus as described in claim 11, wherein the computer program instructions further include:

fifth program code to receive and store the content change request, and to selectively serve the content change request to the first content source upon receipt of a next update from the first content source.

13. The apparatus as described in claim 12 wherein the content change request is served to the first content source as a response payload to the next synchronous update.

14. The apparatus as described claim 11 wherein the content change request is one of: an instruction to alter the temporal location within the first media content, an instruction to pause, resume, fast-forward, rewind or terminate rendering of the first media content, and an instruction to initiate rendering of new media content.

15. A method, operative in association with an overlay network, comprising:

receiving updates from a first content source, at least one update identifying first media content, and data identifying a temporal location within the first media content, wherein an update is generated at the first content source based on an entry in a second content source event manifest previously delivered to the first content source via the overlay network, the second content source event manifest comprising a set of event boundaries that are equally spaced based on a play length of the first media content, the update indicating that the temporal location within the first media content has been reached and an event boundary in the first media content set of event boundaries is crossed;

receiving one or more event requests from a second content source distinct from the first content source, at least one event request seeking an event identifier associated with second content capable of being rendered at the second content source in synchronization with the first media content being rendered on the first content source;

wherein the updates are uncorrelated with the event requests;

in response to receipt of the at least event request, returning to the second content source the event identifier, the event identifier being an instruction to the second content source to obtain and render the second content on the second content source at a given time that corresponds to the event boundary in the set of event boundaries being crossed;

wherein the first content source is a media player, and the second content source is one of: an Internet browser, a browser plug-in, and a mobile application;

wherein at least one of the receiving and returning steps is carried out in software executing in a hardware element.

16. The method as described in claim 15 further including receiving from the second content source a content request that includes the event identifier and, in response, serving the second content to the second content source for rendering at the second content source in synchronization with rendering of the first media content on the first content source.

17. The method as described in claim 15 further including serving the first media content to the first content source.

18. The method as described in claim 15 wherein the first media content is one of: live, and on-demand content, and further including associating multiple second content sources with the first content source.

19. A computer program product in a non-transitory computer-readable medium to:

receive updates from a first content source, at least one update identifying first media content, and data identifying a temporal location within the first media content, wherein an update is generated at the first content source based on an entry in a second content source event manifest previously delivered to the first content source via the overlay network, the second content source event manifest comprising a set of event boundaries that are equally spaced based on a play length of the first media content, the update indicating that the temporal location within the first media content has been reached and an event boundary in the set of event boundaries is crossed;

receive one or more event requests from a second content source distinct from the first content source, at least one event request seeking an event identifier associated with second content capable of being rendered at the second content source in synchronization with the first media content being rendered on the first content source;

wherein the updates are uncorrelated with the event requests;

in response to receipt of the at least event request, return to the second content source the event identifier, the event identifier being an instruction to the second content source to obtain and render the second content on the second content source at a given time that corresponds to the event boundary in the set of event boundaries being crossed;

wherein the first content source is a media player, and the second content source is one of: an Internet browser, a browser plug-in, and a mobile application.

* * * * *